(12) United States Patent
Johnson et al.

(10) Patent No.: US 10,108,880 B2
(45) Date of Patent: Oct. 23, 2018

(54) SYSTEMS AND METHODS OF OBJECT IDENTIFICATION AND DATABASE CREATION

(71) Applicant: Walmart Apollo, LLC, Bentonville, AR (US)

(72) Inventors: Christopher Soames Johnson, Pea Ridge, AR (US); Jimmie Russell Clark, Fayetteville, AR (US); Michael Payne, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/274,407

(22) Filed: Sep. 23, 2016

(65) Prior Publication Data

US 2017/0091579 A1 Mar. 30, 2017

Related U.S. Application Data

(60) Provisional application No. 62/233,738, filed on Sep. 28, 2015.

(51) Int. Cl.
 *G06K 9/46* (2006.01)
 *G06K 7/10* (2006.01)
 (Continued)

(52) U.S. Cl.
 CPC ....... *G06K 9/4671* (2013.01); *G06K 7/10297* (2013.01); *G06K 7/1456* (2013.01);
 (Continued)

(58) Field of Classification Search
 CPC ............. G06K 9/4671; G06K 7/10297; G06K 7/1456; G06K 9/183; G06K 9/6201; G06K 2007/10524; G06Q 10/00
 See application file for complete search history.

(56) References Cited

U.S. PATENT DOCUMENTS 5,497,314 A 3/1996 Novak
5,609,223 A * 3/1997 Iizaka ................. A47F 9/046
 186/61

(Continued)

FOREIGN PATENT DOCUMENTS

EP 0689175 A2 12/1995

OTHER PUBLICATIONS

Amazon Price Check App, http://www.amazon.com/gp/help/customer/display.html?nodeId=200777320, Jun. 18, 2015.

(Continued)

*Primary Examiner* — Brenda C Bernardi
(74) *Attorney, Agent, or Firm* — McCarter & English, LLP; David R. Burns

(57) ABSTRACT

Exemplary embodiments are generally directed to systems and methods of object identification. Exemplary embodiments can scan, by an optical reader, a machine-readable identifier associated with an original object. Exemplary embodiments can capture an image of the original object at a first orientation using an image capture device. Exemplary embodiments can transmit the machine-readable identifier and the image of the original object to an image database to store an association between the image of the original object and the machine-readable identifier. Exemplary embodiments can receive a subsequent object having a subsequent machine-readable identifier that is unavailable or incapable of being scanned. Exemplary embodiments can capture an image of the subsequent object with the image capture device. Exemplary embodiments can execute an image recognition function that outputs object identification information for the image of the subsequent object based on the machine-readable identifier associated with the image of the original object.

20 Claims, 9 Drawing Sheets

(51) Int. Cl.
*G06K 7/14* (2006.01)
*G06Q 10/00* (2012.01)
*G06K 9/18* (2006.01)
*G06K 9/62* (2006.01)

(52) U.S. Cl.
CPC ........... *G06K 9/183* (2013.01); *G06K 9/6201* (2013.01); *G06Q 10/00* (2013.01); *G06K 2007/10524* (2013.01)

(56) References Cited

U.S. PATENT DOCUMENTS

| | | | |
|---|---|---|---|
| 5,969,317 | A | 10/1999 | Espy et al. |
| 7,909,248 | B1 | 3/2011 | Goncalves |
| 7,949,568 | B2 | 5/2011 | Fano et al. |
| 8,117,071 | B1 | 2/2012 | Fitch et al. |
| 8,448,858 | B1 | 5/2013 | Kundu et al. |
| 8,794,524 | B2 * | 8/2014 | Connell, II ........ G06K 7/10554 235/462.01 |
| 9,734,483 | B2 * | 8/2017 | Kitaoka ............... G06Q 10/087 |
| 2002/0170970 | A1* | 11/2002 | Ehrhart ............. G06K 7/10851 235/462.41 |
| 2006/0274171 | A1* | 12/2006 | Wang ....................... G06K 7/14 348/294 |
| 2007/0080228 | A1 | 4/2007 | Knowles et al. |
| 2011/0106656 | A1 | 5/2011 | Schieffelin |

OTHER PUBLICATIONS iTunes Preview, CamFind—Visual Search, QR Reader, Price Comparison & Barcode Scanner, https://itunes.apple.com/us/app/camfind-search-qr-reader-price/id595857716?mt=8, Jun. 18, 2015.

Search Report in related Great Britain Patent Application No. GB1614855.3 dated Feb. 24, 2017.

Mexican Office Action for Application No. MX/a/2016/012507, dated Apr. 4, 2018. 8 pages.

\* cited by examiner

SYSTEMS AND METHODS OF OBJECT IDENTIFICATION AND DATABASE CREATION

CROSS-REFERENCE TO RELATED APPLICATIONS

This application claims the benefit of commonly assigned U.S. Provisional Patent Application No. 62/233,738, which was filed on Sep. 28, 2015. The entire content of the foregoing provisional patent application is incorporated herein by reference.

BACKGROUND

In many applications, a machine-readable identifier, such as a barcode, QR codes, or radio-frequency identification, are often associated with physical objects. These machine-readable identifiers can be read and processed in computing systems to cause one or more operations to be performed. For example, in some environments, the machine-readable identifier can be read and processed in a computing system to retrieve information associated with a physical object corresponding to the machine-readable identifier that was read (e.g., an identity of the physical object that is in a data format that can be recognized by the computing system). Use of machine-readable identifiers can be an effective mechanism for facilitating recognition of the physical object with which they are associated. However, if the machine-readable identifier for a given physical object is unavailable or cannot be read, it may be necessary to find another one of the given physical objects that is accompanied by a readable machine-readable identifier or to look-up information about the physical object by entering characteristics/parameters of the physical object into the computer system until the appropriate information about the physical object is found. Such procedures require high overhead costs for manually generating the database in which searches are to be performed and may be susceptible to fraudulent activities.

SUMMARY

Exemplary embodiments of the present disclosure overcome the disadvantages of conventional systems and methods by providing for database creation and object identification to efficiently and effectively generate databases of images of physical objects when their associated machine-readable identifiers are read and subsequently utilizing the database for image recognition when the machine-identifier of the physical objects are unavailable or unreadable and/or when reading a machine-readable identifier to ensure that the machine-readable object corresponds to the machine-readable identifier that is read for the object. In particular, the exemplary systems and methods provide for a redundant system such that when a first system fails (e.g., the machine-readable identifier is unavailable or unreadable), the redundant system can be used to identify the object in an efficient manner. The redundancy of the system improves the ability of object identification at a point-of-sale system during a checkout process.

In one example application, exemplary embodiments of the systems and methods described herein can provide for a computerized improvement to the functioning of a point-of-sale system by being able to automatically (or substantially automatically) compile and generate a database of images during the checkout process. In particular, exemplary embodiments can generate an image database including images of objects during the checkout process, and further use the image database for image recognition of objects during a subsequent checkout process when machine-readable identifiers associated with an object are unavailable or incapable of being scanned.

The systems and methods are specifically advantageous for environments including point-of-sale systems that receive and process high volumes of objects, which can result in long checkout times and queues if the machine-readable identifier of an object cannot be scanned or is unavailable. The systems and methods are also advantageous for environments that sell high volumes of objects, which can require high overhead costs for building and generating image databases outside of the checkout process.

In accordance with embodiments of the present disclosure, a computer-implemented method of identifying objects using image recognition is provided. The method includes scanning, by an optical reader, a machine-readable identifier associated with an original object. The method includes capturing an image of the original object at a first orientation using an image capture device. The method includes programmatically transmitting the machine-readable identifier and the image of the original object to an image database to programmatically store an association between the image of the original object and the machine-readable identifier.

The method includes receiving a subsequent object having a subsequent machine-readable identifier that is unavailable or incapable of being scanned. The method includes capturing an image of the subsequent object with the image capture device. The method includes executing an image recognition function that receives as input the image of the subsequent object. The image recognition function can compare the image of the subsequent object to other images in the image database to identify similar images. The similar images can include at least the image of the original object. The image recognition function can output object identification information for the image of the subsequent object based on the machine-readable identifier associated with the image of the original object.

In some embodiments, the optical reader can be a barcode scanner, a radio-frequency identification scanner, or both. The machine-readable identifier of the original object can be a barcode, a radio-frequency identification, or both. The image capture device can include one or more cameras.

The method can include programmatically transmitting the image of the original object to a server, and programmatically transmitting the image of the original object from the server to the image database. In some embodiments, scanning the machine-readable identifier associated with the original object with the optical reader can actuate the image capture device to automatically capture the image of the original object. The method can include programmatically associating the object identification information of the original object obtained from scanning the machine-readable identifier associated with the original with the image of the original object in the image database. The object identification information can include at least one of an object name, an object description, or an object cost.

The method can include displaying the object identification information at a graphical user interface (GUI). The method can include capturing a second image of the original object at a second orientation using the image capture device. The method can include programmatically transmitting the second image of the original object to the image database to programmatically store an association between the image of the original object, the second image of the original object and the machine-readable identifier.

In accordance with embodiments of the present disclosure, a system for synchronized imaging of objects and machine-readable identifiers associated with the objects is provided. The system includes an optical reader. The optical reader can be configured to read a machine-readable identifier associated with an object. The system includes at least one image capture device. The image capture device can be configured to capture an image of the object. The system includes a processing device operatively coupled to the optical reader and the image capture device. The processing device controls the optical reader and the image capture device to synchronize reading of the machine-readable identifier by the optical reader and capturing of the image of the object by the image capture device to automatically capture the image of the object.

The system includes an image database configured to store one or more images of the object. The image database can be configured to programmatically store an association between the image of the object and the machine-readable identifier associated with the objects. The image capture device can be configured to capture an image of a subsequent object. The subsequent object can include a subsequent machine-readable identifier that is unavailable or incapable of being scanned. The processing device can be configured to programmatically execute an image recognition function that receives as input the image of the subsequent object. The image recognition function can compare the image of the subsequent object to other images in the image database to identify similar images. The similar images can include at least the image of the object. The image recognition function can output object identification information for the image of the subsequent object based on the machine-readable identifier associated with the image of the object. The system can include a GUI configured to display the object identification information for the image of the subsequent object.

In accordance with embodiments of the present disclosure, a system for synchronized imaging of objects and machine-readable identifiers associated with the objects is provided. The system includes an optical reader. The optical reader can be configured to read a machine-readable identifier associated with an original object. The system includes an image capture device. The image capture device can be configured to capture an image of the original object, and capture an image of a subsequent object. The subsequent object can include a subsequent machine-readable identifier that is unavailable or incapable of being read. The system includes an image database configured to programmatically store an association between the image of the original object and the machine-readable identifier associated with the original object.

The system includes a processing device operatively coupled to the optical reader, the image capture device and the image database. The processing device can be configured to programmatically execute an image recognition function that receives as input the image of the subsequent object. The image recognition function can compare the image of the subsequent object to other images in the image database to identify similar images. The similar images can include at least the image of the original object. The image recognition function can output object identification information for the subsequent image based on the machine-readable identifier associated with the image of the original object.

In some embodiments, the optical reader can include a handheld or portable optical reader. In some embodiments, the image capture device can be incorporated into the handheld or portable optical reader.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed systems and associated methods, reference is made to the accompanying figures, wherein.

DETAILED DESCRIPTION

Exemplary embodiments of the present disclosure overcome the disadvantages of conventional methods by providing for a system of object identification to efficiently and effectively generate databases of images of objects to be used for image recognition when machine-readable identifiers associated with the objects are read. Subsequently, when a machine-readable identifier for a given object is unreadable or unavailable, exemplary embodiments of the present disclosure can capture an image of the object and search the database of images to identify the object to allow the computing system to perform one or more operations based on the identification of the object.

As one non-limiting application of exemplary embodiments of the present disclosure, the systems and methods described herein can provide for a computerized improvement to the functioning of a point-of-sale system by being able to automatically (or substantially automatically) compile and generate a database of images during a checkout process. In particular, exemplary embodiments can generate a database including images of objects that are captured as machine-readable identifiers associated with the objects are read by the point-of-sale system during the checkout process, and can further use the database of images for image recognition of objects during a subsequent checkout process when machine-readable identifiers associated with objects are unavailable or incapable of being read. Image matching can therefore be used to locate information about the object including an identity of the object and other attributes/parameters associated with the object directly at a point-of-sale terminal, resulting in an efficient checkout process.

As one non-limiting application of exemplary embodiments of the present disclosure, the systems and methods described herein can provide for a computerized improvement to the functioning of a point-of-sale system by reducing the likelihood of fraud using the redundant system described herein. For example, when a machine-readable identifier associated an object is read by an optical scanner, an image capture of the object can be triggered. The image can be compared to images stored in the database and the system can return an identity of the object. The identity of the object as determined using image recognition can be compared to the identity of the object as determined based on the reading of the machine-readable identifier. If the identities returned are different, it can be determined by the system that there is potential that the machine-readable identifier associated with the object has been altered or replaced by another machine-readable identifier associated with a different object.

Figure 1:
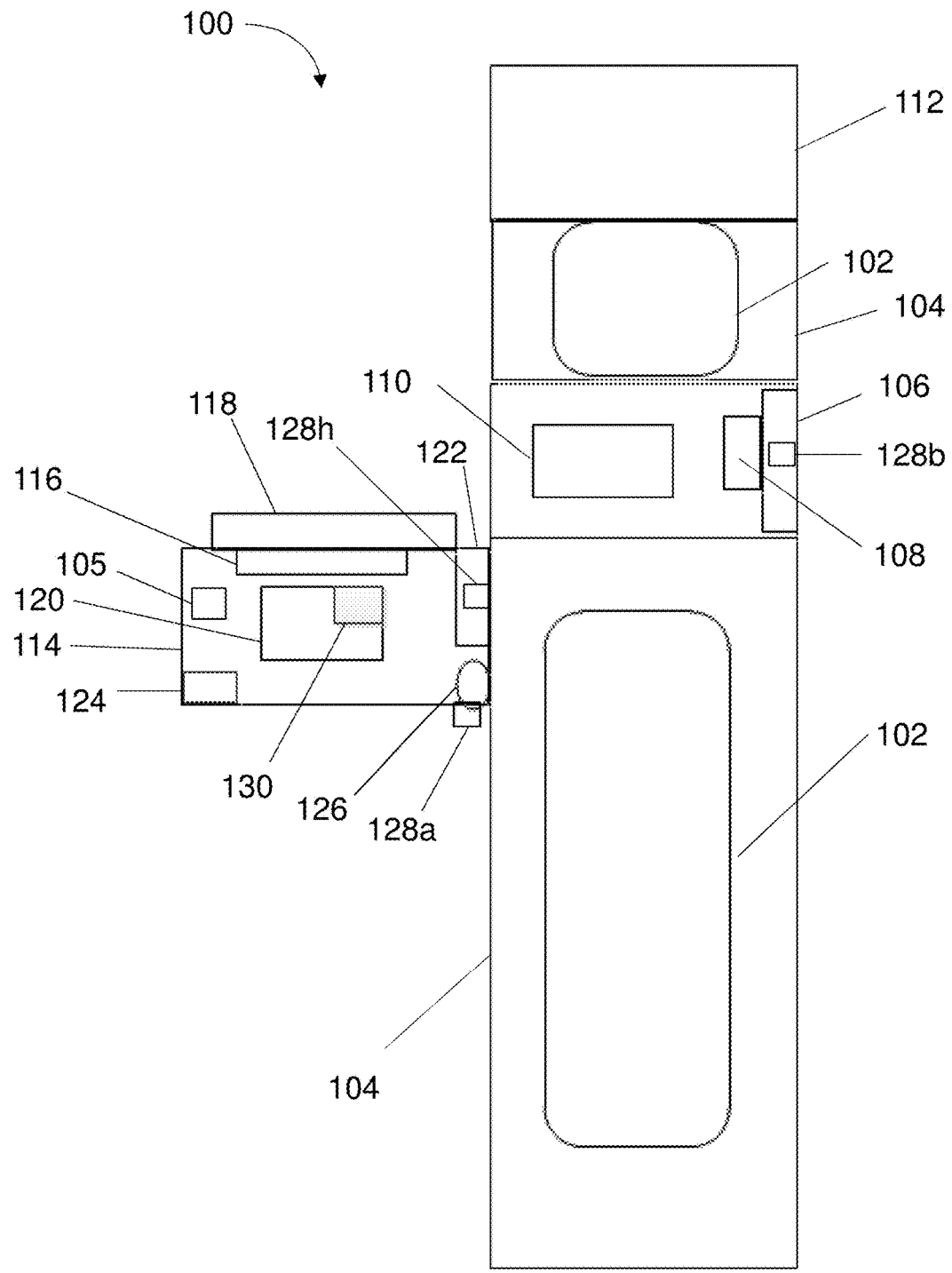
FIG. 1 is a block diagram of an exemplary system for reading machine-readable identifiers associated with objects, capturing images of the objects, and/or identifying objects based on previously captured images in accordance with exemplary embodiments of the present disclosure.

FIG. 1 is a block diagram of a point-of-sale system 100 (hereinafter "POS system 100") in accordance with embodiments of the present disclosure. The POS system 100 can be used by a cashier or attendant at a retail location for a checkout process when customers purchase objects. The POS system 100 can include a POS controller 105, one or more belts 102, respective belt cabinets 104, a card reader or scanner 106, and an optical reader 108. The POS system 100 can also include a scale 110, a bagging station 112, a cash box 114, a keyboard 116, a cash drawer 118, and a display 120. The POS system 100 can further include a portable optical reader 122 (e.g., a scan gun, or the like), a receipt printer 124, a network and electricity pole 126, one or more image capture devices 128a-h, and a customer display 130. In some embodiments, the POS system 100 can be configured as a self-checkout POS system that allows customers to checkout with no or minimum interaction of an employee of the retail location.

The belts 102 can be conveyer or endless belts disposed in the belt cabinets 104. The belt cabinets 104 can include rollers (e.g., friction and drive rollers, or the like) and a drive motor for actuating and moving the belts 102. The driver motor can control one or more of the rollers to rotate the belt 102 to provide a transport system for moving objects to be purchased from one end of the belt cabinet 104 to an opposite end of the belt cabinet 104. For example, one belt 102 can be driven to move an object placed on the belt 102 towards the optical reader 108, and another belt 102 can be driven to move the object away from the optical reader 108.

In some embodiments, the belt cabinets 104 can define a substantially rectangular structure including side and bottom walls. A belt 102 can extend along a top portion of each of the respective belt cabinets 104. In some embodiments, additional POS system 100 components can be disposed on or in one or more of the belt cabinets 104. For example, in some embodiments, at least one of the belt cabinets 104 can support the card reader 106, the optical reader 108, the scale 110, and/or the customer display 130, as well as any other suitable POS system 100 components.

The card reader 106 can be a magnetic card reader configured to read encoded information from magnetic strips of payment cards (e.g., credit cards, debit cards, gift cards, or the like). The magnetic reader can decode the encoded information associated with payment cards and can transmit the decoded information to the POS controller 105, or can in the alternative, transmit the encoded information to the POS controller 105, which can decode the encoded information. A customer or cashier can use the card reader 106 to input tender information into the POS system 100 to complete a purchase of one or more objects by the customer.

In some embodiments, the card reader 106 can include one or more microcontrollers and can execute reader firmware to implement one or more functions carried out by the card reader 106. While an example embodiment has been illustrated as including a magnetic card reader 106, those skilled in the art will recognize that other types of readers can be utilized instead of, or in addition to, the magnetic card reader 106. For example, in some embodiments, the card reader 106 can include near field communication (NFC) reader capability, Radio Frequency Identification (RFID) reader capability, or both, to wirelessly interact with a customer's payment type.

The optical reader 108 can be configured to scan and read machine-readable identifiers, such as a barcode, RFID tags, QR codes, or the like, associated with objects. In particular, the optical reader 108 can be configured to scan encoded information from machine-readable identifiers, and can be further configured to decode the encoded information to transmit object identification information associated with an object (e.g., a SKU number) to the POS controller 105. In some embodiments, the POS controller 105 can decode the encoded information. A customer or cashier can therefore use the optical reader 108 to provide the POS controller 105 with identifying information of the object with which the machine-readable identifier is associated. For example, the optical reader 108 can be configured to scan barcodes or quick response (QR) codes associated with objects to be purchased by a customer and information embedded in the barcodes or QR codes can be utilized by the POS controller 105 to retrieve information about the objects associated with the barcodes or QR codes, such as prices of the objects. In some embodiments, the optical reader 108 can include one or more microcontrollers disposed therein and can execute reader firmware to implement one or more functions carried out by the optical reader 108.

The scale 110 can be an electronic weighing machine configured to determine a weight of an object placed on the scale 110. In some embodiments, the scale 110 can be an analog or digital scale that calculates the weight of an object using one or more strain gauges or other suitable devices that can convert a force applied to the scale 110 by an object (e.g., from gravity) to an electrical signal. For example, the scale 110 can be used at the POS system 100 to weigh an object to be purchased, where the price of the object depends on the weight of the object. In some embodiments, a customer or cashier can use the scale 110 to input a weight of an object into the POS system 100 to determine a price of the object. In some embodiments, a weight of an object can be automatically input into the POS system 100 by the scale 110 when the weight of the object is stabilized and measured. In some embodiments, the scale 110 can include one or more microcontrollers and can execute weighing firmware to implement one or more functions carried out by the scale 110.

The bagging station 112 can be disposed at the end of the POS system 100. The bagging station 112 can include a structure for supporting and storing bags. The bagging station 112 can further include an area that allows customers or employees to add scanned/purchased objects into the bags.

The cash box 114 can be a structure that generally includes side walls, a back wall, a top wall, and an open front face. An interior area of the cash box 114 can include a cavity having one or more shelves for supporting components of the POS controller 105 and/or alternative items or components used at the POS system 100. In some embodiments, the cash box 114 can support one or more peripheral components, such as, for example, the keyboard 116, the cash drawer 118, the display 120, the portable optical reader 122, the receipt printer 124, or the like.

The keyboard 116 can be operatively coupled to the POS system 100 and can be a multi-touch input system for customers, cashiers, or both, to enter information into the display 120. In some embodiments, the keyboard 116 can be incorporated into the display 120 such that a touch screen of the display 120 can be used to electronically input data into the POS controller 105. The keyboard 116 provides functionality of I/O services receiving input from user input. In some embodiments, the keyboard 116 can be supported on top of the cash box 114. In some embodiments, the keyboard 116 can include an integrated card reader that allows a cashier to swipe a customer's payment card (e.g., credit card, debit card, gift card, or the like). In some embodiments, the keyboard 116 can include one or more microcontrollers and can execute firmware to implement one or more functions carried out by the keyboard 116.

The cash drawer 118 can be a storage system for holding monetary funds customers use to pay for their transactions. The cash drawer 118 can include an electromechanical lock, an electromagnetic lock, or both, to selectively lock and unlock the cash drawer 118 in response to, for example, control signals received from the POS controller 105. For example, when a customer pays for a transaction with cash, the cashier can input the tender type and amount into the keyboard 116 and a processor of the POS controller 105 can process the input to transmit a control signal to the lock of the cash drawer 118 to allow the cash drawer 118 to open, thereby permitting the cashier to place the money in the cash drawer 118 and retrieve any change owed to the customer. In some embodiments, the cash drawer 118 can be disposed in an interior area or cavity of the cash box 114.

The display 120 and customer display 130 can be in the form of a computer monitor operatively coupled to the POS controller 105, and can display data input/output and generated by the POS controller. The display 120 and customer display 130 can display information regarding objects intended to be purchased along with information regarding completing the transaction and any other suitable information. In some embodiments, the display 120 and customer display 130 can be disposed on top of the cash box 114. In some embodiments, the display 120 can include a touch screen interface such that at least some data can be input into the display 120 through the display 120.

The portable optical reader 122 can be in the form of a handheld optical scanning machine configured to scan and read machine-readable identifiers associated with objects. The portable optical reader 122 can be portable where users can hold the portable optical reader 122 and scan the machine-readable identifiers. The portable optical reader 122 can be configured to scan encoded information from the machine-readable identifiers. The portable optical reader 122 can decode the encoded information and transmit the decoded information to the POS system 100. In some embodiments, the POS system 100 can decode the encoded information.

The portable optical reader 122 can be used to input object information into the POS controller 105 for use when processing a transaction for a customer. For example, the portable optical reader 122 can be configured to scan barcodes, QR codes, RFID tags, or the like, associated with objects to be purchased by a customer and/or can scan customer loyalty/rewards cards/tags. In some embodiments, the portable optical reader 122 can include one or more microcontrollers and can execute portable optical reader firmware to implement one or more functions carried out by the portable optical reader 122.

The receipt printer 124 can be a printer configured to print receipts for completed customer transactions. In some embodiments, the receipt printer 124 can be supported by the cash box 114 and can be operatively coupled to the POS controller 105. The POS system 100 can send information and instructions to the receipt printer 124 to instruct the receipt printer 124 to print receipts for transactions. In some embodiments, the receipt printer 124 can include one or more microcontrollers and can execute printer firmware to implement one or more functions carried out by the receipt printer 124.

Power and network connectivity can be provided to the components of the POS system 100 via the network and electricity pole 126. The network and electricity pole 126 can extend generally vertically from the sales floor and/or from the ceiling and can form a conduit through which power and network cables can be routed to the POS system 100 to provide electricity and network connectivity to one or more of the terminal components. In some embodiments, the network and electricity pole 126 can be positioned adjacent to the cash box 114 and the power and network cables can be routed from the pole 126 to and through the cash box 114.

One or more of the components of the POS system 100 can be configured to receive software updates via the network cable(s), can be configured to transmit data/information collected at the POS system 100 to one or more remote servers in communication with the POS system 100 over a communication network via the network cable, and/or can be configured to receive data/information from the one or more remote servers in communication with the POS system 100 over a communication network via the network cable. For example, embedded information in a machine-readable identifier and/or image captured by image capturing devices in the POS system 100 can processed by the POS controller 105 and can be transmitted to the one or more remote servers (e.g., for ad-hoc database creation, image recognition, retrieval of object information associated with the machine-readable identifier and/or image). In some embodiments, the network and electricity pole 126 can connect multiple POS systems 100 relative to each other and relative to a central processor, database, or both, via a communication network, such that data (e.g., captured images of objects, object identification information, or the like) can be shared between the POS systems 100.

The POS system 100 can include one or more image capture devices 128a-h operatively coupled to the POS controller 105. It should be understood that discussion of an image capture device 128 applies to any and/or all of the potential image capture devices 128a-h incorporated into the POS system 100. In some embodiments, the image capture devices 128a-h can capture still images, video, or both. In some embodiments, the image capture devices 128a-h can be in the form of a camera configured to capture images of objects.

As an example, the image capture device 128a can be positioned at or near the cash box 114 (see FIG. 1). As a further example, the image capture device 128a can be mounted to the network and electricity pole 126 at a level above the cash box 114 (see FIG. 1). As a further example, the image capture device 128b can be positioned at or near the optical reader 108 (see FIG. 1). As a further example, the image capture device 128b can be positioned at an elevated level over the optical reader 108 to obtain a top view of objects being scanned at the optical reader 108 (see FIG. 1). As a further example, the image capture device 128c can be mounted to a rod or pole at a level above and overlooking the optical reader 108 (see FIG. 2). As a further example, the image capture devices 128d-f can be positioned on or be incorporated into a vertical component 204 and/or a horizontal component 206 of the optical reader 108 (see FIG. 2). As a further example, the image capture device 128g can be positioned or mounted on a portion of the ceiling 216 above the POS system 100 (see FIG. 3). As a further example, the image capture device 128h can be positioned or incorporated into the portable optical reader 122 (see FIG. 1).

In an exemplary operation of the POS system 100, a customer, cashier, or both, can process and complete a transaction for objects intended for purchase. Objects for purchase can be placed on one of the belts 102 and can be transported towards the optical reader 108. The POS system 100 can optically read the machine-readable identifier associated with the object using the optical reader 108 or the portable optical reader 122. The POS system 100 can display the price of the object identified by optically reading the machine-readable identifier on the customer display 130. The POS system 100 can complete the transaction by accepting customer payment using the card reader 106 and printing a receipt of the transaction for the customer using the receipt printer 124. After the machine-readable identifier of an object is scanned, the object can be placed on another one of the belts 102 to transport the object to the bagging station 112.

The exemplary object identification system disclosed herein can be incorporated into one or more components of the POS system 100. In particular, the POS system 100 can be programmed such that scanning the machine-readable identifier of an object with the optical reader 108 or the portable optical reader 122 actuates the image capture device 128 to capture one or more images of the object. For example, the image capture device 128 can be oriented towards the optical reader 108 and the surrounding area to capture an image of the object as the object is scanned or immediately after. In some embodiments, actuation of the image capture device 128 to capture the image(s) of the object can be automatic and substantially simultaneous to the scanning process. In some embodiments, the POS system 100 can be programmed to synchronize the time of scanning the machine-readable identifier of the object and capturing an image of the object.

In some embodiments, scanning of the machine-readable identifier of an object with the optical reader 108 can trigger the optical reader 108 and/or the POS controller 105 to electronically send a control signal to one or more of the image capture devices 128 to instruct the image capture devices 128 to capture one or more images of the object scanned. In some embodiments, scanning of the machine-readable identifier of an object with the optical reader 108 can trigger the optical reader 108 to electronically send a signal to the POS controller 105 indicating that the optical reader 108 just read a machine-readable identifier of an object and the POS controller 105 can electronically transmit a control signal to the one or more image capture devices 128 to instruct the image capture devices 128 to capture one or more images of the object scanned. Thus, the process of capturing the image(s) of the object does not slow down the checkout process and, instead, occurs substantially simultaneously to scanning the object. The captured images of the object can be at one or more different orientations such that multiple views of the object can be captured.

In some embodiments, as described herein, the portable optical reader 122 can include the image capture device 128h incorporated therein such that scanning the machine-readable identifier of the object with the portable optical reader 122 actuates the image capture device of the portable optical reader 122 (and/or the image capture device 128h) to capture one or more images of the object. For example, upon successfully reading a machine-readable identifier, the portable optical reader 122 can control the image capture device 128h to capture an image of the object. In some embodiments, the portable optical reader 122 can control the image capture device 128h to capture an image and scan for a machine-readable identifier simultaneously (e.g., in response to actuation of a button or trigger on the portable optical reader 122). In some embodiments, the image capture device 128h of the portable optical reader 122 can be used to capture an image of an object that is too large to fit onto the optical reader 108 or too large to be captured by the image capture device 128a-g. For example, the portable optical reader 122 can initially be used to scan the machine-readable identifier of the object and time is allotted for the cashier to step away from the object to capture an image of the entire object.

The POS system 100 can be programmed to electronically transmit the machine-readable identifier read by the optical reader 108 or the portable optical reader 122 and the image(s) of the object captured by one or more of the image capture devices 128a-h through network cables (or wirelessly) to a database of images. In some embodiments, each POS system 100 can include therein an image database for storing the images captured at the respective POS system 100. In some embodiments, the retail establishment can include a central image database that receives the images captured by the POS systems 100 to generate a single database in which images of the objects sold by the retail establishment are stored.

An association between the image of the original object and the machine-readable identifier can be stored in the database. In particular, the images of an object can be grouped together based on the machine-readable identifier associated with the object, and object identification information (e.g., an object name, an object description, an object cost, an object location in the retail establishment, or the like) related to the object can be associated with the images and/or the machine-readable identifier. Thus, during normal operation of the checkout process and without additional input from the customer or cashier, a database of images can be generated that includes one or more captured images of objects and object identification information associated with the objects.

As a non-limiting example, a first customer takes part in a checkout process at a POS system 100 in a retail establishment. The first customer is purchasing a carton of eggs, a box of pens, and a package of batteries. As each of the machine-readable identifiers associated with the objects is scanned at the optical reader 108 or 122, an image of the respective objects is captured by one or more of the image capture device 128a-h and stored in the database of images. For example, as the machine-readable identifier of the carton of eggs is being scanned by the optical reader 108, the image capture devices 128a-h can be automatically controlled to capture one or more images of the carton of eggs at one or more different orientations from one or more perspectives. The captured images of the eggs are stored in the database with an association to the corresponding machine-readable identifier, and any object identification information (e.g., cost, name, brand, weight, description, or the like) retrieved based on the machine-readable identifier can also be associated with the captured images of the eggs. A similar process occurs when the machine-readable identifier for the box of pens and the package of batteries is scanned. As more instances of these objects are scanned (e.g., their machine-readable identifiers are read), more images of the objects can be stored in the database, which can enhance and/or improve subsequent image recognition as described herein.

During a subsequent checkout process, a different customer takes part in the checkout process at the POS system 100 (or a different POS system 100 within the retail environment). The customer may be purchasing a carton of eggs and a package of paper towels. Scanning the machine-readable identifier of the carton of eggs using the optical reader 108 or 122 actuates one or more of the image capture device 128a-h to capture one or more images of the carton of eggs. A processor of the POS controller 105 can query the image database to determine if sufficient images of the carton of eggs captured different orientations from different perspectives have been stored. In particular, the POS controller 105 can determine whether the captured images are repetitive or duplicates of images captured during previous checkout processes. If the POS system 100 determines that the images provide different or clearer views of the carton of eggs, the subsequent images can be stored in the database and associated with the images and object identification information previously transmitted to the image database based on the machine-readable identifier associated with the carton of eggs. Since the package of paper towels has not been previously entered into the image database, scanning the package of paper towels can cause one or more of the image capture device 128a-h to capture images of the paper towels and can cause the POS controller 105 to populate the database with the captured images of the paper towels. The images can be associated with the machine-readable identifier corresponding to the package of paper towels and object identification information for the package of paper towels can also be associated with the images and/or the machine-readable identifier. Thus, the database can be created in real-time and over a period of time based on the checkout processes occurring at one or more POS systems 100.

The database generated by the POS system 100 can assist in identifying objects during subsequent checkout processes when the machine-readable identifier associated with the object is unavailable or incapable of being scanned. In particular, after the image database has been generated, a subsequent object can be brought by a customer to the POS system 100 for checkout. The subsequent object may have a machine-readable identifier that is unavailable or incapable of being scanned. For example, the machine-readable identifier may be damaged or has fallen off the object.

Rather than sending an associate to locate another one of the objects having the machine-readable identifier and/or determining the cost associated with the object, the POS system 100 can be implemented to process the subsequent object with a readable machine-readable identifier using image recognition based on the images stored in the database to determine the cost of the subsequent object for use by the POS system 100 in a time efficient manner. In particular, the image capture device 128 (or the image capture device of the portable optical reader 122) can be used to capture an image of the subsequent object. The processor of the POS system 100 can programmatically execute an image recognition function that receives as input the image of the subsequent object and compares the image of the subsequent object to other images stored in the image database to identify similar images. The similar images can include at least one image of the original object.

If an exact match between the subsequent and original images is made, the image recognition function can output object identification information for the image of the subsequent object based on the machine-readable identifier associated with the image of the original object in the image database. Thus, the cost associated with the object can be displayed on the GUI 120. The checkout process can then continue for any other objects being purchased by the customer.

If an exact match is not made, the POS system 100 can generate instructions to the user for inputting another image of the object at a different orientation or can provide images most closely matching the subsequent image to allow the user to choose the correct object. For embodiments in which another image capture of the object is requested, if an exact match still cannot be made, the POS system 100 can output more potential matches via the GUI 120 that have been narrowed down based on the image recognition function. For example, the potential matches can be displayed on the GUI 120 as a grid of images of the original objects that most closely match the subsequent image. In some embodiments, the user can narrow down the results of potential matches by inputting keywords (e.g., item type, manufacturer name, or the like) into a search engine associated with the results. The cashier or user can select through the GUI 120 the correct object that corresponds to the subsequent object and the cost associated with the object can be displayed on the GUI 120. The checkout process can then continue for any other objects being purchased by the customer.

If no appropriate matches are found through the described process, an associate can locate the same object in the retail establishment. The machine-readable identifier associated with the replacement object can be scanned, and an image of the object can be captured for future image recognition.

As an example, during a subsequent checkout process, a second customer is purchasing a carton of eggs. The machine-readable identifier associated with the carton of eggs may be damaged and, therefore, unavailable for scanning with the optical reader 108. Implementing the object identification system, the image capture device 128 can be used to capture an image of the carton of eggs. The processor of the POS system 100 can execute the image recognition function to compare the image of the carton of eggs captured during the subsequent checkout process to the images stored in the image database.

If a match is made between the subsequent image and the original image of the carton of eggs, the image recognition function can output object identification information associated with the carton of eggs. The cost of the carton of eggs can thereby be obtained in a timely manner. If a match is not made between the subsequent image and the original image, the image recognition function can output two or more potential matches for selection by the user. For example, the POS system 100 can display different brands of eggs that may match the carton of eggs being purchased by the second customer. The image corresponding to the correct carton of eggs can be selected by the user to obtain the object identification information associated with the carton of eggs.

As another non-limiting example, the POS system 100 can use the optical reader and the image capture device to facilitate fraud detection. For example, when a machine-readable identifier associated with an object is read by an optical reader, the image capture device can be actuated to automatically capture an image of the object. The image can be compared to images stored in the database and the system 100 can return an identity of the object. The identity of the object as determined using image recognition can be compared to the identity of the object as determined based on the reading of the machine-readable identifier. If the identities returned are different, it can be determined by the system 100 that there is potential that the machine-readable identifier associated with the object has been altered or replaced by another machine-readable identifier associated with a different object.

Figure 2:
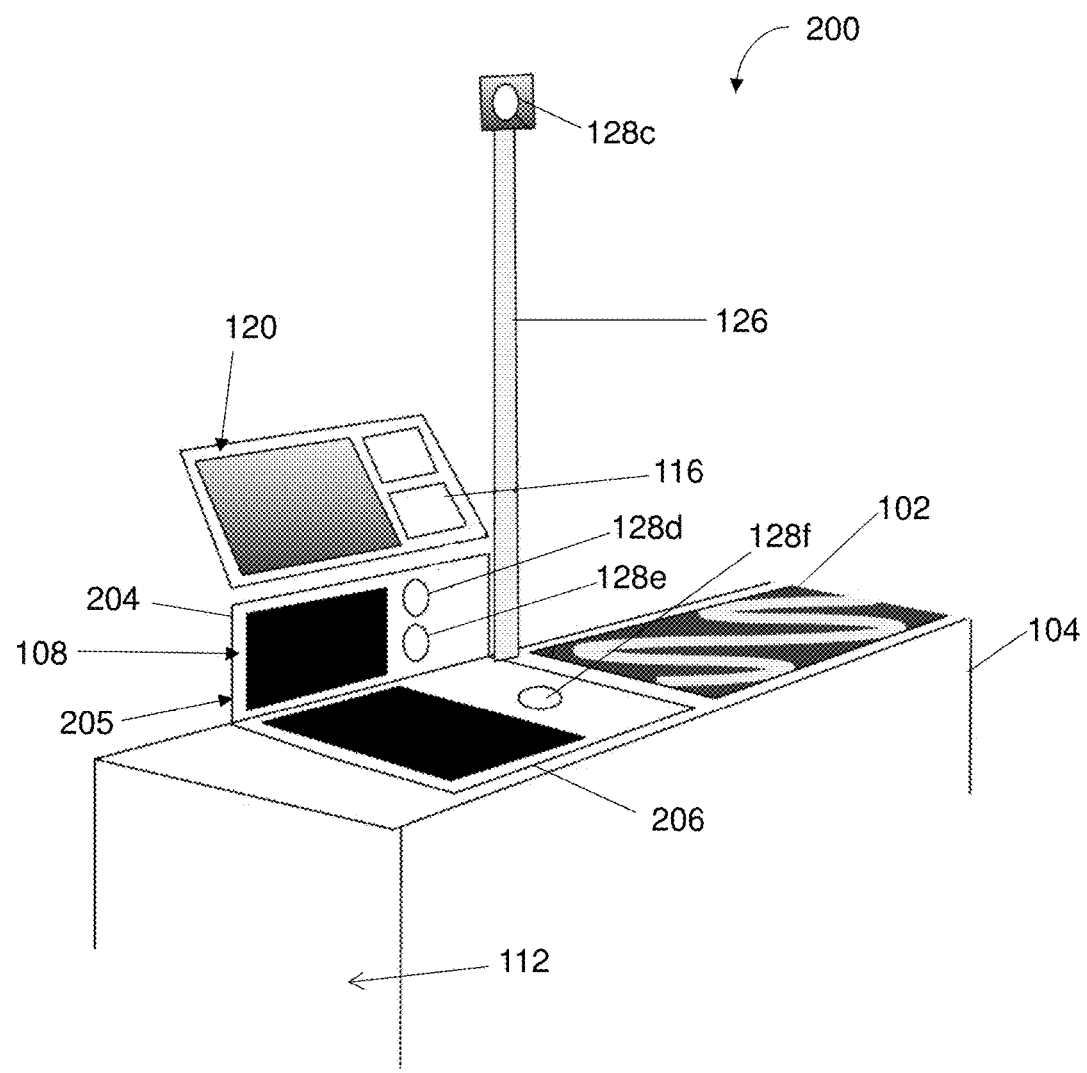
FIG. 2 is a block diagram of another exemplary system for reading machine-readable identifiers associated with objects, capturing images of the objects, and/or identifying objects based on previously captured images in accordance with embodiments of the present disclosure.
Figure 3:
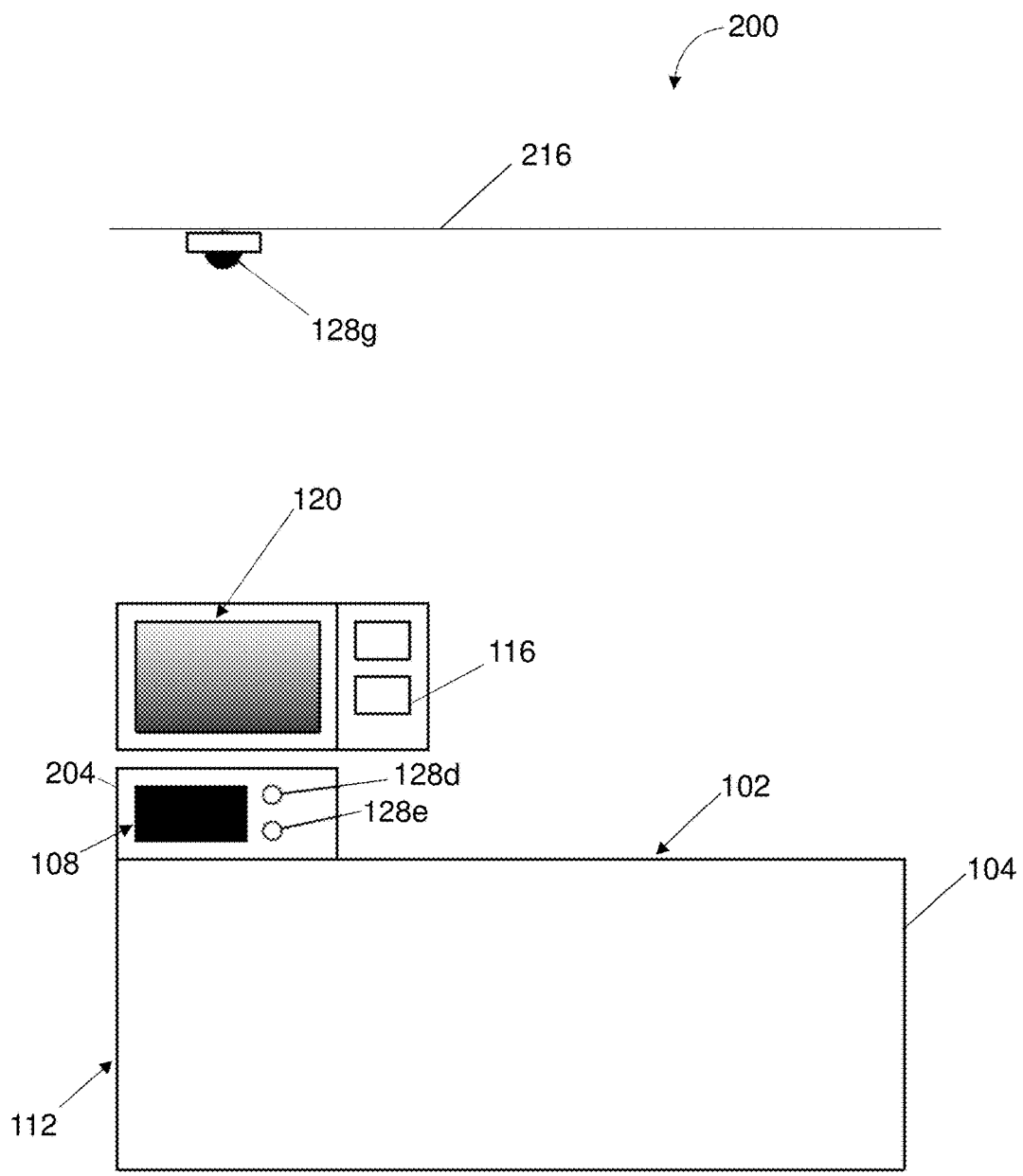
FIG. 3 is a block diagram of yet another exemplary system for reading machine-readable identifiers associated with objects, capturing images of the objects, and/or identifying objects based on previously captured images in accordance with embodiments of the present disclosure.

FIGS. 2 and 3 are block diagrams of a point-of-sale system 200 (hereinafter "POS system 200") in accordance with embodiments of the present disclosure. The POS system 200 can be substantially similar in structure and function to the POS system 100, except for the distinctions noted herein. Therefore, like reference numbers are used for like structures. Although the POS system 200 is shown as including only some of the components of the POS system 100, it should be understood that each of the POS systems 100, 200 discussed herein can include the components described herein.

The POS system 200 can include one or more image capture devices disposed around the optical reader 108 to capture images of the object being scanned. In some embodiments, the POS system 200 can include an image capture device 128c mounted to the network and electricity pole 126 at a point above the optical reader 108. The image capture device 128c can thereby obtain a top (or top perspective) view of the object being scanned. In some embodiments, the image capture device 128c can be mounted to a pole or structure separate from the network and electricity pole 126.

In some embodiments, the POS system 200 can include a reader assembly or housing 205 that includes a vertical component 204 and a horizontal component 206. The vertical component 204, the horizontal component 206, or both, can include the optical reader 108 incorporated herein. The vertical and horizontal components 204, 206 allow scanning of machine-readable identifiers associated with objects without necessitating multiple rotations of the object to obtain a successful scan. In some embodiments, the vertical component 204 and/or the horizontal component 206 can include a mirror that scatters light output by the optical reader 108 to allow the reader 108 to reader barcodes at different orientations with respect to the optical reader 108. In some embodiments, the vertical component 204 of the optical reader 108 can include one or more image capture devices 128d-e associated therewith to capture images of different orientations of the object. For example, the one or more image capture devices 128d-e can share the housing 205 associated with the vertical component 204. In some embodiments, the horizontal component 206 of the optical reader 108 can include one or more image capture devices 128f associated therewith to capture images of different orientations of the object. In some embodiments, the POS system 200 can include one or more image capture devices 128c mounted to structures around the POS system 200. For example, FIG. 3 shows an image capture device 128g mounted to a portion of the ceiling 216 above the POS system 200.

Thus, images showing different angles or orientations of the objects can be obtained. In some embodiments, upon scanning the machine-readable identifier of the object, each of the image capture devices associated with the POS system 200 can be actuated to capture an image of the object. In some embodiments, upon scanning the machine-readable identifier of the object, only specific image capture devices associated with the POS system 200 can be actuated to capture an image of the object.

Figure 4:
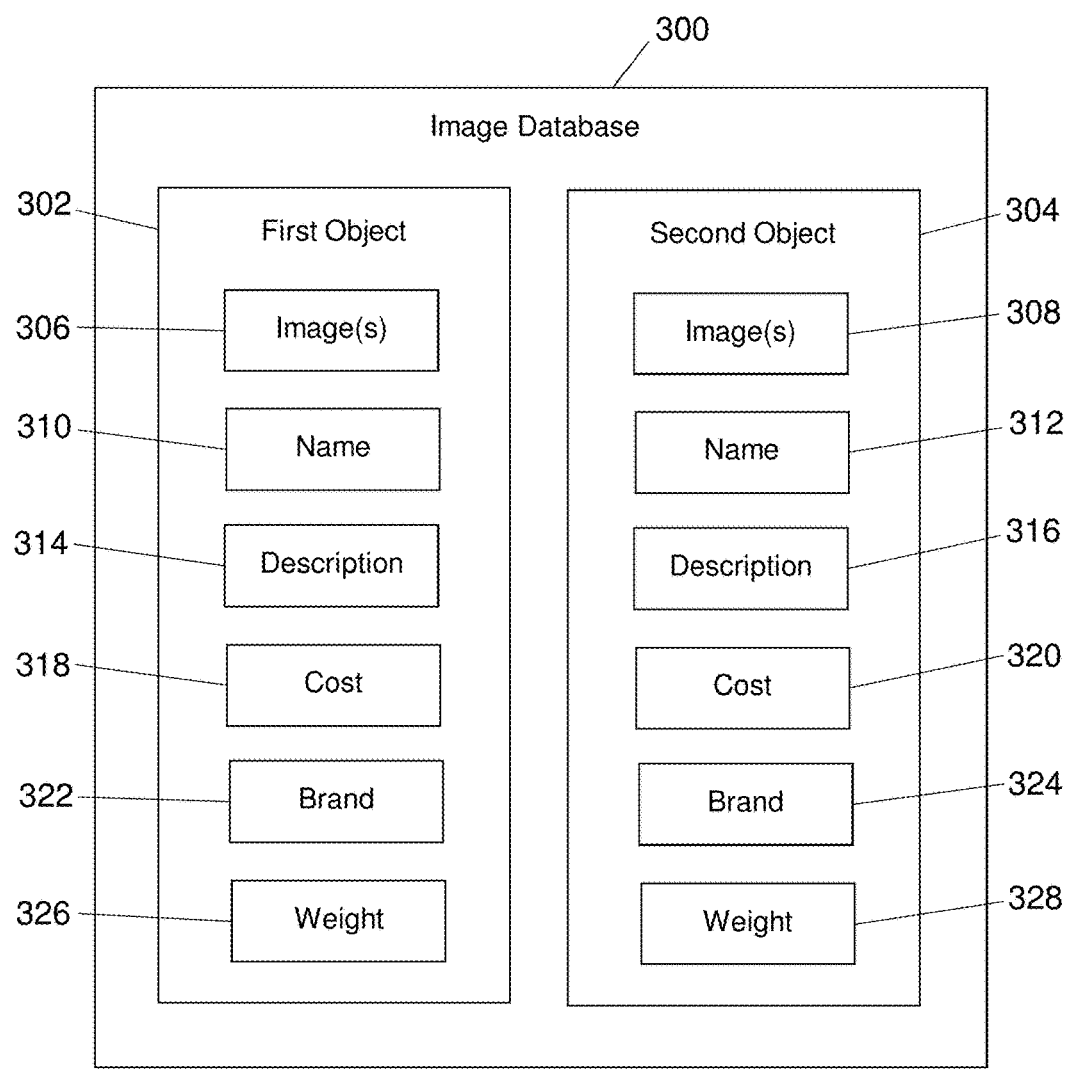
FIG. 4 is a block diagram of an image database of an object identification system in accordance with embodiments of the present disclosure.

FIG. 4 is a block diagram of an image database 300 associated with the POS systems 100, 200. The image database 300 can be used to store images and object identification information associated with the images for a plurality of objects. For example, the image database 300 includes data relating to a first object 302 (e.g., a carton of eggs) and a second object 304 (e.g., a box of pens). Each object 302, 304 includes one or more images 306, 308 and object identification data. As images are captured of the objects, the image database 300 can be updated and populated in real-time to ensure a sufficient number of images of the objects are stored for image recognition purposes. In some embodiments, the object identification data can include, e.g., an object name 310, 312, description 314, 316, cost 318, 320, brand 322, 324, weight 326, 328, combinations thereof, or the like.

Figure 5:
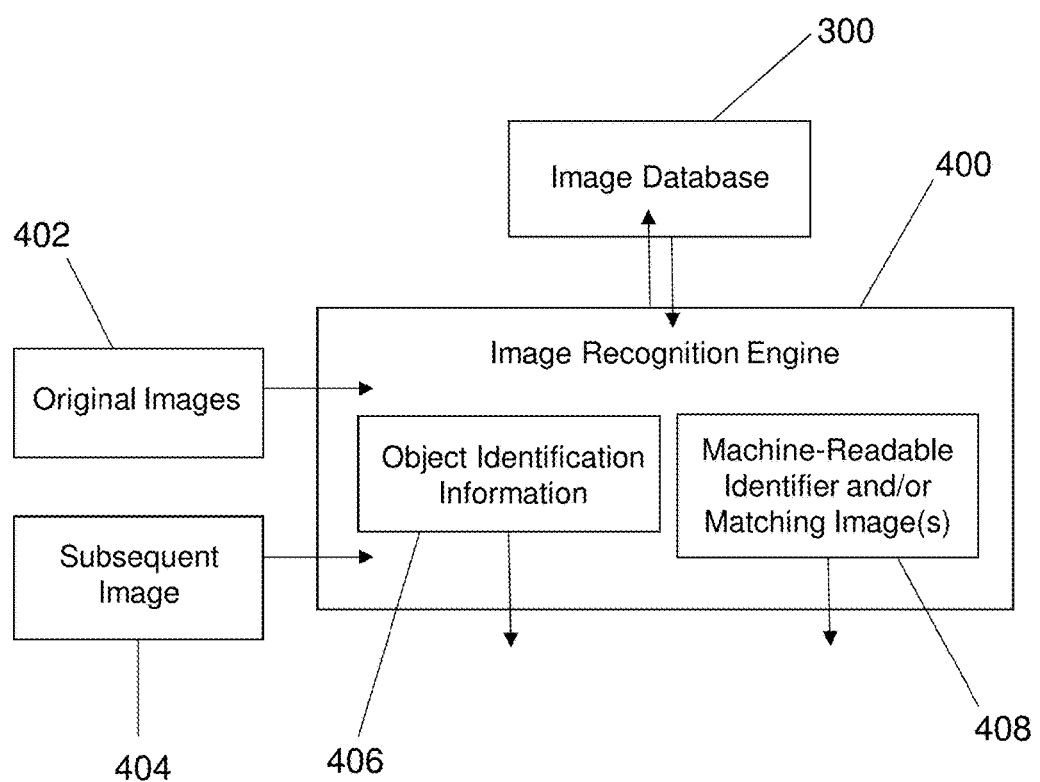
FIG. 5 is a block diagram of an image recognition engine of an object identification system in accordance with embodiments of the present disclosure.

FIG. 5 is a block diagram of an image recognition engine 400 for programmatically executing the image recognition function discussed above. The image recognition engine 400 can receive as input original images 402 (e.g., images 306, 308) stored in the image database 300, and one or more subsequent images 404 captured of an object that has a machine-readable identifier that is unavailable or incapable of being scanned. The image recognition engine 400 can be in communication with the image database 300, allowing for transmission and/or receipt of data between the image recognition engine 400 and the image database 300. For example, the image recognition engine 400 can query the image database 300 to receive one or more images of objects for performing the image recognition function. The image recognition engine 400 compares the original images 402 to the subsequent images 404 and, when a match is determined based on image recognition, outputs object identification information 406 relating to the subsequent image 404 based on the machine-readable identifier associated with the image of the original object. For example, based on the image recognition function, the image recognition engine 400 can output one or more machine-readable identifiers, matching images, or both, for potential matches to the subsequent image 404.

Figure 6:
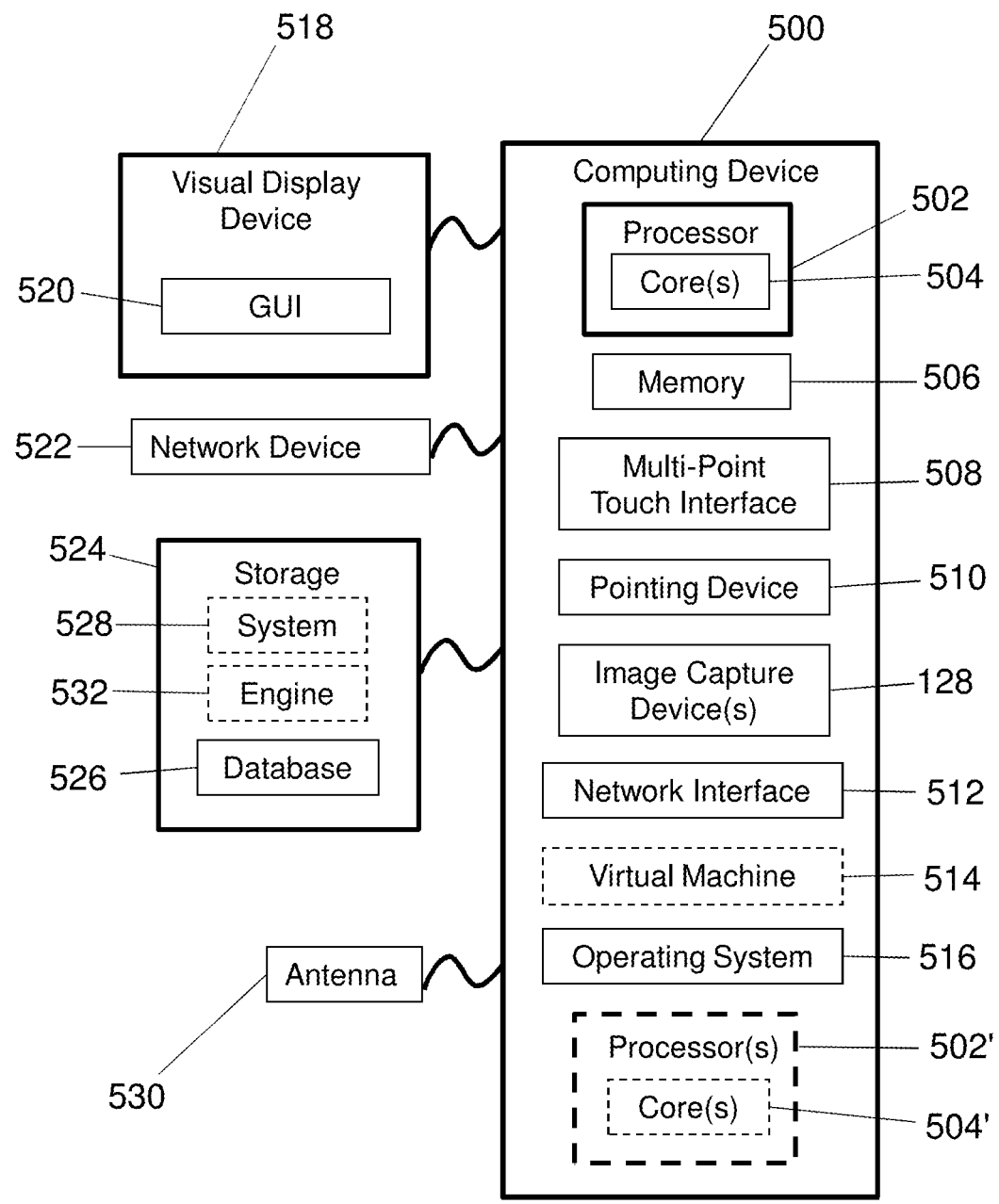
FIG. 6 is a block diagram of a computing device configured to implement embodiments of an object identification system in accordance with embodiments of the present disclosure.

FIG. 6 is a block diagram of a computing device 500 configured to implement embodiments of the object identification system in accordance with embodiments of the present disclosure. The computing device 500 can be a POS controller of the POS systems 100, 200, can be a separate computing device from the POS systems 100, 200 (e.g., a remote server communicatively coupled to the POS controller), combinations thereof, or the like. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the present disclosure (e.g., the optical reader 108, the portable optical reader 122, the image capture devices 128a-h, the image recognition engine 300, combinations thereof, or the like). The computing device 500 also includes configurable and/or programmable processor 502 (including a central processing unit (CPU)) and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device may be shared dynamically. A virtual machine 514 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof.

A user may interact with the computing device 500 through a visual display device 518, such as a computer monitor, which may display one or more user interfaces 520 that may be provided in accordance with exemplary embodiments (e.g., the user interface associated with the GUI 120). The computing device 500 may include other I/O devices for receiving input from a user, for example, a keyboard, an image capture device 128, or any suitable multi-point touch interface 508, a pointing device 510 (e.g., a mouse), or the like. The keyboard 508 and the pointing device 510 may be coupled to the visual display device 518. The computing device 500 may include other suitable conventional I/O peripherals.

The computing device 500 may also include one or more storage devices 524, such as a hard-drive, CD-ROM, or other computer readable media, for storing data and computer-readable instructions and/or software that implement exemplary embodiments of the object identification system 528 described herein. In some embodiments, the storage device 524 can store an instance of the image recognition engine 532. Exemplary storage device 524 may also store one or more databases 526 for storing any suitable information required to implement exemplary embodiments. For example, exemplary storage device 524 can store one or more databases 526 for storing information, such as data stored within the database 300, and computer-readable instructions and/or software that implement exemplary embodiments described herein. The databases 526 may be updated by manually or automatically at any suitable time to add, delete, and/or update one or more items in the databases 526.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein. The computing device 500 can also include one or more antennas 530 for wirelessly interfacing the computing device 500 to any type of wireless network communication protocol and performing the operations described herein. Moreover, the computing device 500 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 500 may run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 516 may be run in native mode or emulated mode. In an exemplary embodiment, the operating system 516 may be run on one or more cloud machine instances.

Figure 7:
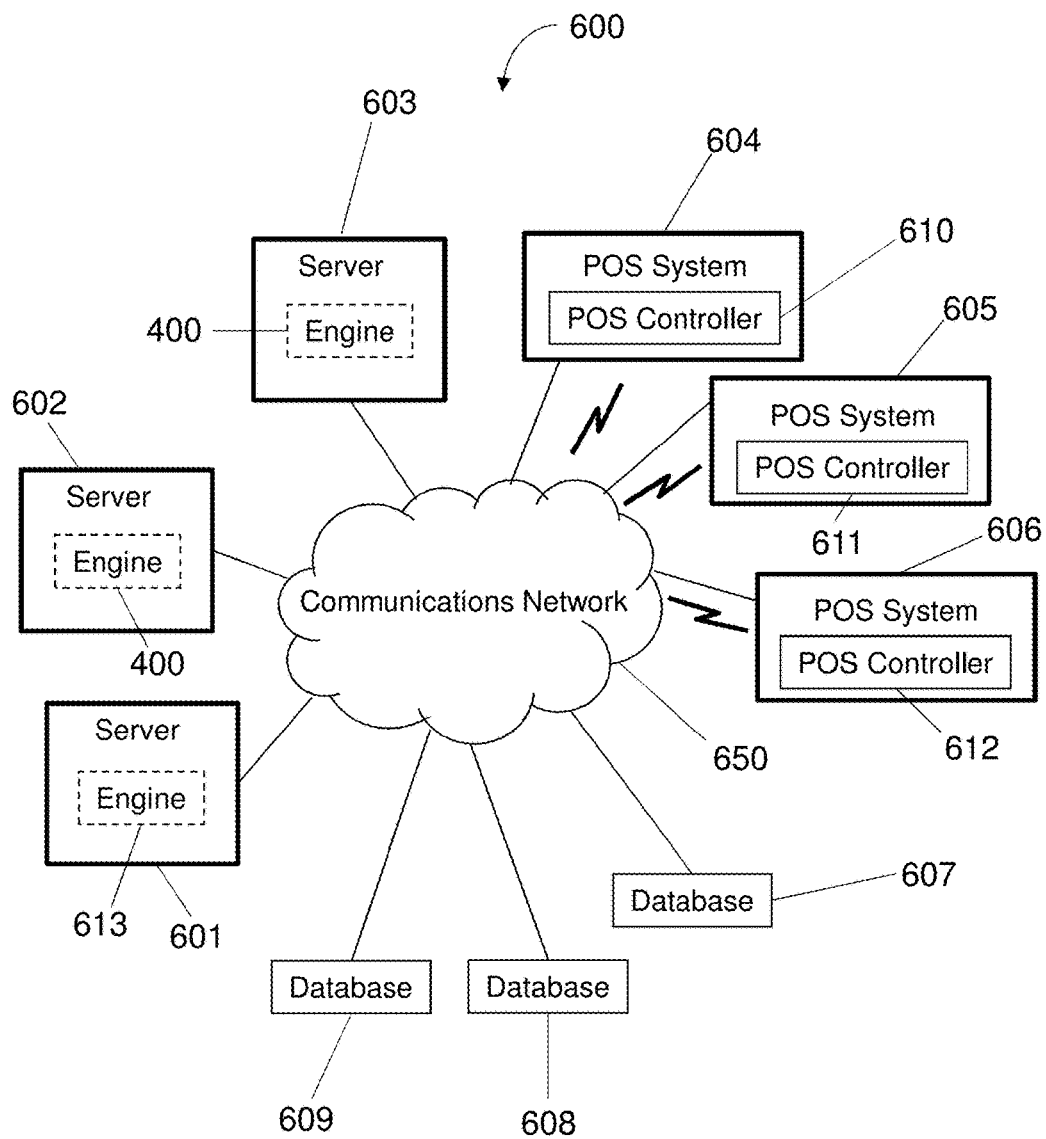
FIG. 7 is a block diagram of a distributed environment for implementing embodiments of an object identification system in accordance with embodiments of the present disclosure.

FIG. 7 is a block diagram of a distributed environment 600 for implementing embodiments of the object identification system in accordance with embodiments of the present disclosure. The environment 600 can include servers 601-603 operatively coupled to one or more POS systems 604-606 including POS controllers 610-612, respectively, and databases 607-609, via a communication network 650, which can be any network over which information can be transmitted between the servers 601-603, POS controllers 610-612, and databases 607-609. For example, the communication network 650 can be the Internet, Intranet, virtual private network (VPN), wide area network (WAN), local area network (LAN), and the like. In exemplary embodiments, the servers 601-603, user interfaces 604-606, and database devices 606-609 can be implemented as computing devices (e.g., embodiments of computing device 500). Those skilled in the art will recognize that the databases 606-609 can be incorporated into one or more of the servers 601-603 such that one or more of the servers 601-603 can include the databases 606-609.

In some embodiments, the databases 606-609 can store information relating to the image database 300. In some embodiments, information relating to the image database 300 can be distributed over one or more of the databases 606-609.

In some embodiments, embodiments of the server 601 can be configured to implement the one or more portions of an object identification engine 613 associated with the object identification system 528. In some embodiments, the one or more of the image recognition engines 400 can be implemented in a distributed configuration over the servers 601-603. For example, the servers 602, 603 can implement the image recognition engines 400, and the server 601 can implement one or more portions of the object identification engine 613. In some embodiments, the servers 601-603 can separately or integrally implement one or more portions of the object identification engine 613 and the image recognition engines 400. In some embodiments, the user interfaces 604-606 include a graphical user interface for presenting information to the user.

Figure 8:
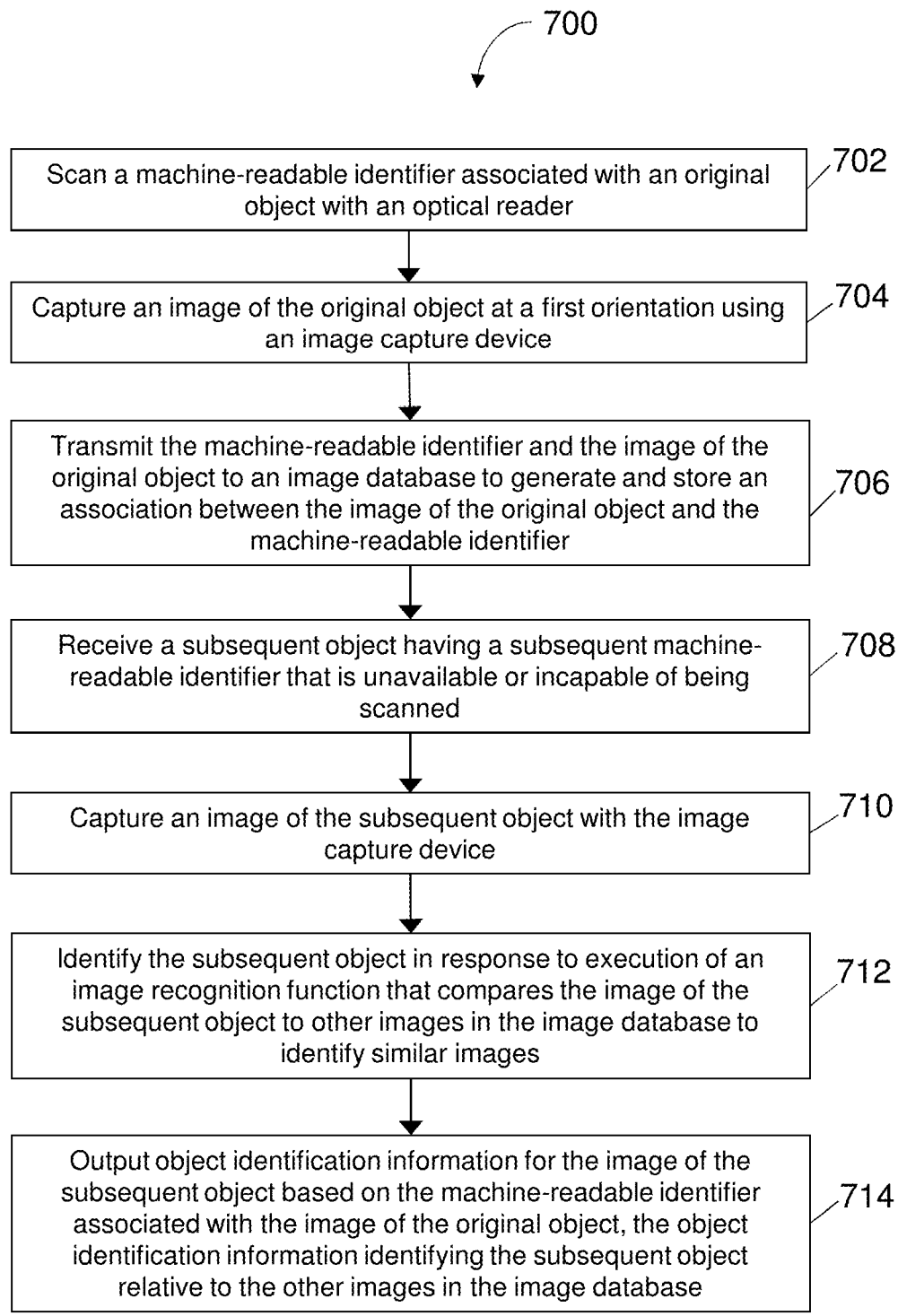
FIG. 8 is a flowchart illustrating implementation of an object identification system in accordance with embodiments of the present disclosure.

FIG. 8 is a flowchart illustrating an exemplary object identification process 700 as implemented by the POS systems 100, 200 in accordance with embodiments of the present disclosure. To begin, at step 702, a machine-readable identifier associated with an original object can be scanned with an optical reader. At step 704, an image of the original object at a first orientation can be captured by an image capture device. In particular, scanning of the machine-readable identifier associated with the original object can activate the image capture device to substantially simultaneously capture an image of the original object or can activate the image capture device after and/or in response to reading of the machine-readable identifier. At step 706, the machine-readable identifier and the image of the original object can be transmitted by the POS controller to an image database to store the original image and to generate and store an association between the image of the original object and the machine-readable identifier.

At step 708, during a subsequent transaction, a subsequent object having a subsequent machine-readable identifier that is unavailable or incapable of being read by an optical reader can be received. At step 710, an image of the subsequent object can be captured with the image capture device. At step 712, an image recognition engine can be programmatically executed to identify the subsequent object. In particular, at step 712, the image recognition function can be executed to compare the image of the subsequent object to other images in the image database to identify similar images. As one example, the POS controller can execute the image recognition engine, which can search the image database for like/similar images in the image database. As another example, the POS controller can transmit the image to a remote server, and the remote server can execute the image recognition engine to search for like/similar images in the image database. The similar images can include at least the image of the original object.

At step 714, object identification information for the image of the subsequent object can be output based on the machine-readable identifier associated with the image of the original object (e.g., based on an association between the machine-readable identifier and the image of the original object). The object identification information can identify the subsequent object relative to the other images in the image database. The exemplary object identification system thereby provides means for the POS system to identify an object without relying on the machine-readable identifier associated with the object (e.g., when the machine-readable identifier is unreadable or unavailable) to provide a back-up system to reading of machine-readable identifiers. Using this approach, the POS system can obtain cost and additional information associated with an object in a time efficient manner at the POS system.

Figure 9:
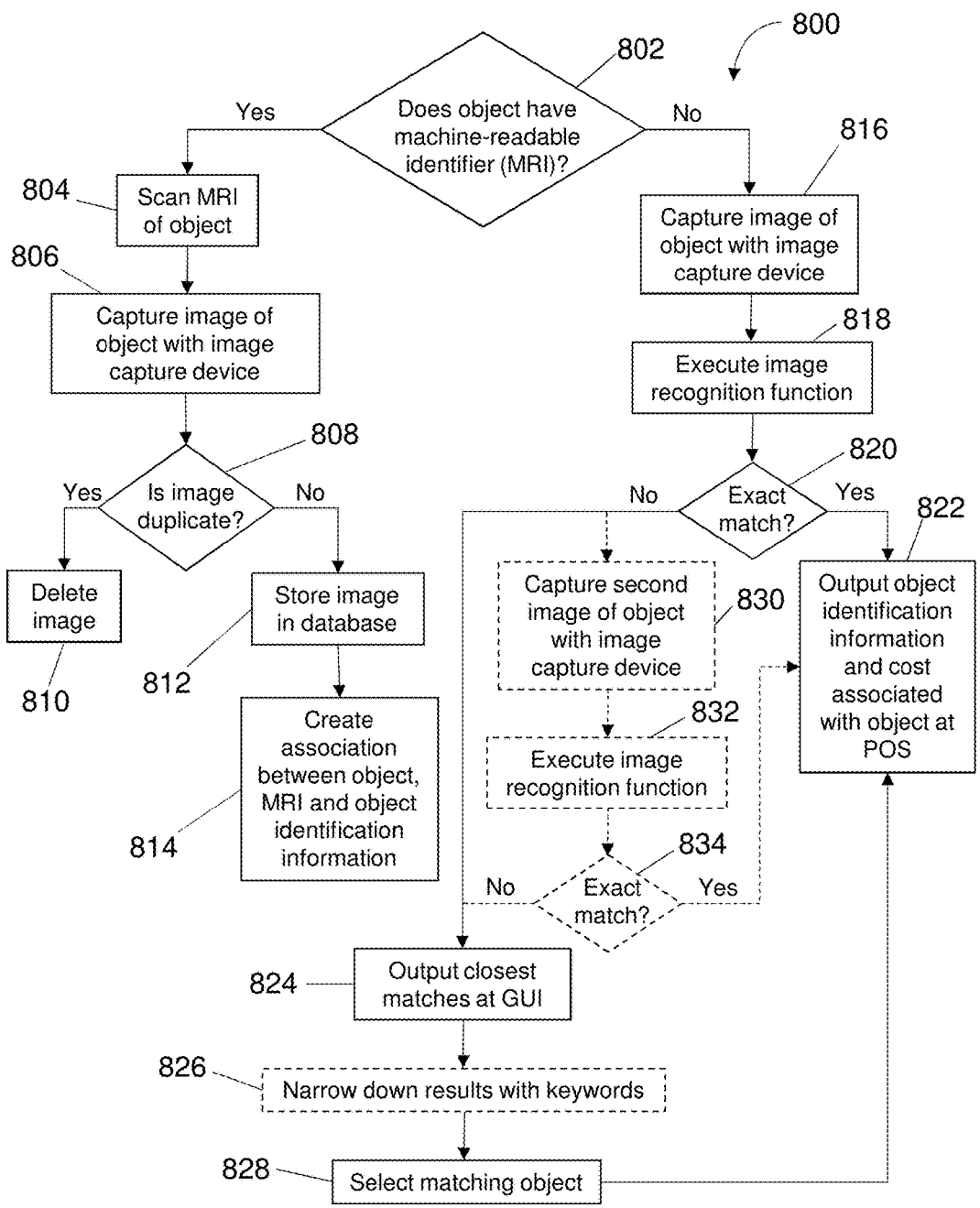
FIG. 9 is a flowchart illustrating an implementation of an object identification system in accordance with embodiments of the present disclosure.

FIG. 9 is a flowchart illustrating an exemplary object identification process 800 as implemented by the POS systems 100, 200 in accordance with embodiments of the present disclosure. To begin, at step 802, when an object is brought to a POS system for checkout, a determination can be made whether the object has a machine-readable identifier that can be scanned or read by the optical reader. If the machine-readable identifier can be scanned or read by the optical reader, at step 804, the machine-readable identifier can be scanned or read. At step 806, scanning the machine-readable identifier can actuate or send signals to capture an image of the object with one or more image capture devices.

At step 808, the POS controller and/or alternative components of the POS system can determine whether the captured image is a duplicate, repetitive or shows orientations of the object that were previously captured and stored in the image database. If the captured image is found to be a duplicate, at step 810, the image can be deleted. If the captured image is found to be different from previously captured images (or no previously captured images have been captured of the object), at step 812, the image can be stored in the image database. At step 814, an associated between the object, the image of the object, the machine-readable identifier, object identification information, combinations thereof, or the like, can be created.

If the machine-readable identifier cannot be scanned or is unavailable at step 802, an image of the object being purchased can be captured with one or more image capture devices at step 816. At step 818, the POS system and/or the POS controller can execute an image recognition function based on the input captured image and images stored in the image database. At step 820, a determination can be made whether an exact match between the captured image of the object and images stored in the image database has been made. If an exact match has been made, at step 822, the POS system can output on a GUI of the POS the object identification information and cost associated with the object.

If an exact match between the captured image of the object and images stored in the image database cannot be made at step 820, one or more of the closest matches can be output on the GUI of the POS for selection by a user at step 824. Optionally, at step 826, a user can narrow down the results of the closest matches on the GUI of the POS by inputting keywords. At step 828, if an exact match of the object is located, the user can select the matching object. At step 822, the POS system can output on the GUI of the POS the object identification information and cost associated with the object.

Optionally, if an exact match between the captured image of the object and images stored in the image database cannot be made at step 820, the POS system can request the user to capture a second image of the object with the image capture device at step 830. At step 832, the POS system and/or the POS controller can execute the image recognition function based on the input second captured image and images stored in the image database. At step 834, a determination can be made whether an exact match between the second captured image of the object and images stored in the image database has been made. If an exact match has been made, at step 822, the POS system can output on the GUI of the POS the object identification information and cost associated with the object. If an exact match has not been made, the POS system can output one or more of the closest matches on the GUI of the POS for selection by a user at step 824. The user can thereby narrow down the closest matches and select the matching object.

If no appropriate matches are found through the described process, an associate can locate the same object in the retail establishment. The machine-readable identifier associated with the replacement object can be scanned (at step 804), and an image of the object can be captured for future image recognition (at step 806).

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method of identifying objects using image recognition, comprising:
    scanning, by an optical reader, a machine-readable identifier associated with an original object;
    capturing an image of the original object at a first orientation using an image capture device, the image capture device disposed remotely from the optical reader;
    transmitting the machine-readable identifier and the image of the original object to an image database to store an association between the image of the original object and the machine-readable identifier;
    receiving a subsequent object having a subsequent machine-readable identifier that is unavailable or incapable of being scanned;
    capturing an image of the subsequent object with the image capture device; and
    identifying the subsequent object in response to execution of an image recognition function that receives as input the image of the subsequent object, compares the image of the subsequent object to other images in the image database to identify similar images, the similar images including at least the image of the original object, and that outputs object identification information for the image of the subsequent object based on the machine-readable identifier associated with the image of the original object, the object identification information identifying the subsequent object relative to the other images in the image database;
    wherein scanning the machine-readable identifier associated with the original object with the optical reader actuates the image capture device to automatically capture the image of the original object.

2. The method of claim 1, wherein the optical reader is at least one of a barcode scanner or a radio-frequency identification scanner.

3. The method of claim 1, wherein the machine-readable identifier of the original object is at least one of a barcode or a radio-frequency identification.

4. The method of claim 1, wherein the image capture device comprises one or more cameras.

5. The method of claim 1, comprising transmitting the image of the original object to a server, and further comprising transmitting the image of the original object from the server to the image database.

6. The method of claim 1, comprising associating the object information data of the original object obtained from scanning the machine-readable identifier associated with the original object with the image of the original object in the image database.

7. The method of claim 6, wherein the object identification information comprises at least one of an object name, an object description, or an object cost.

8. The method of claim 1, comprising displaying the object identification information at a graphical user interface.

9. The method of claim 1, comprising capturing a second image of the original object at a second orientation using the image capture device.

10. The method of claim 9, transmitting the second image of the original object to the image database to store an association between the image of the original object, the second image of the original object and the machine-readable identifier.

11. A system for synchronized imaging of objects and machine-readable identifiers associated with the objects, the system comprising:
    an optical reader, the optical reader being configured to read a machine-readable identifier associated with an object;
    an image capture device, the image capture device being configured to capture an image of the object, and the image capture device is disposed remotely from the optical reader;
    a processing device operatively coupled to the optical reader and the image capture device, wherein the processing device controls the optical reader and the image capture device to synchronize reading of the machine-readable identifier by the optical reader and capturing of the image of the object by the image capture device to automatically capture the image of the object;
    wherein reading of the machine-readable identifier associated with the object with the optical reader actuates the image capture device to automatically capture the image of the object.

12. The system of claim 11, comprising an image database configured to store the image of the object.

13. The system of claim 12, wherein the image database is configured to store an association between the image of the object and the machine-readable identifier associated with the object.

14. The system of claim 11, wherein the image capture device is configured to capture an image of a subsequent object, the subsequent object having a subsequent machine-readable identifier that is unavailable or incapable of being scanned.

15. The system of claim 14, wherein the processing device is configured to execute an image recognition function that receives as input the image of the subsequent object, compare the image of the subsequent object to other images in an image database to identify similar images, the similar images including at least the image of the object, and outputs object identification information for the image of the subsequent object based on the machine-readable identifier associated with the image of the object, the object identification information identifying the subsequent object relative to the other images in the image database.

16. The system of claim 15, comprising a graphical user interface configured to display the object identification information for the image of the subsequent object.

17. A system for synchronized imaging of objects and machine-readable identifiers associated with the objects, the system comprising:
    an optical reader, the optical reader being configured to read a machine-readable identifier associated with an original object;
    an image capture device, the image capture device being configured to (i) capture an image of the original object, and (ii) capture an image of a subsequent object, the subsequent object having a subsequent machine-readable identifier that is unavailable or incapable of being read, the image capture device disposed remotely from the optical reader;

an image database configured to store an association between the image of the original object and the machine-readable identifier associated with the original object;

a processing device operatively coupled to the optical reader, the image capture device and the image database, wherein the processing device is configured to execute an image recognition function that receives as input the image of the subsequent object, compares the image of the subsequent object to other images in the image database to identify similar images, the similar images including at least the image of the original object, and that outputs object identification information for the subsequent image based on the machine-readable identifier associated with the image of the original object, the object identification information identifying the subsequent object relative to the other images in the image database:

wherein reading the machine-readable identifier associated with the original object with the optical reader actuates the image capture device to automatically capture the image of the original object.

18. The system of claim 17, wherein the optical reader comprises a handheld or portable optical reader.

19. The system of claim 18, wherein the image capture device is incorporated into the handheld or portable optical reader.

20. The method of claim 1, comprising capturing the image of the original object at a first orientation using the image capture device and capturing a second image of the original object at a second orientation using a second image capture device, the first and second orientation being different, and wherein scanning the machine-readable identifier associated with the original object with the optical reader actuates the image capture device and the second image capture device to automatically and substantially simultaneously capture the images of the original object.

* * * * *